United States Patent
Sun et al.

(10) Patent No.: US 9,573,481 B2
(45) Date of Patent: *Feb. 21, 2017

(54) METHOD AND DEVICE FOR CHARGING ELECTRIC VEHICLE IN POWER SYSTEM

(71) Applicant: Tsinghua University, Beijing (CN)

(72) Inventors: Hongbin Sun, Beijing (CN); Qinglai Guo, Beijing (CN); Boming Zhang, Beijing (CN); Wenchuan Wu, Beijing (CN); Zhengshuo Li, Beijing (CN); Shujun Xin, Beijing (CN)

(73) Assignee: TSINGHUA UNIVERSITY, Beijing (CN)

(*) Notice: Subject to any disclaimer, the term of this patent is extended or adjusted under 35 U.S.C. 154(b) by 244 days.

This patent is subject to a terminal disclaimer.

(21) Appl. No.: 14/461,335

(22) Filed: Aug. 15, 2014

(65) Prior Publication Data

US 2015/0145477 A1 May 28, 2015

(30) Foreign Application Priority Data

Nov. 28, 2013 (CN) .......................... 2013 1 0618439

(51) Int. Cl.
*H02J 7/00* (2006.01)
*B60L 11/18* (2006.01)

(52) U.S. Cl.
CPC ........ *B60L 11/1851* (2013.01); *B60L 11/1842* (2013.01); *Y02E 60/721* (2013.01); *Y02T 10/7005* (2013.01); *Y02T 10/705* (2013.01); *Y02T 10/7072* (2013.01); *Y02T 90/121* (2013.01); *Y02T 90/128* (2013.01); *Y02T 90/14* (2013.01); *Y02T 90/163* (2013.01); *Y04S 10/126* (2013.01)

(58) Field of Classification Search
CPC ............ G05B 13/02; G05B 17/02; H02J 3/14; H02J 13/0062; H02J 2003/007; H02J 13/001; H02J 3/32; H02J 3/008; H02J 3/381; H02J 13/0006; H02J 7/0054; H02J 7/0055; H02J 2003/146; H02J 3/383
USPC .................................................. 320/108–115
See application file for complete search history.

(56) References Cited

U.S. PATENT DOCUMENTS

| 2011/0025267 A1* | 2/2011 | Kamen .................... B60L 8/003 320/109 |
| 2013/0229149 A1* | 9/2013 | Sortomme ................ H02J 7/00 320/109 |

* cited by examiner

*Primary Examiner* — Binh Tat
(74) *Attorney, Agent, or Firm* — Kile Park Reed & Houtteman PLLC

(57) ABSTRACT

A method and a device for charging an electric vehicle in a power system are provided. The method includes: obtaining a first electric vehicle connected to the power system, and obtaining a rated charging power and a first charging requirement; determining a first charging period corresponding to the first electric vehicle; determining a forecast period, and obtaining a second electric vehicle to be connected to the power system; revising the first charging period to obtain a second charging period, and obtaining a second charging requirement and a maximum charging power; establishing a charging model, establishing a first constraint of the charging model, and establishing a second constraint of the charging model; and solving the charging model under the first constraint and the second constraint to obtain an optimal charging power so as to charge each first electric vehicle under the optimal charging power.

11 Claims, 2 Drawing Sheets

METHOD AND DEVICE FOR CHARGING ELECTRIC VEHICLE IN POWER SYSTEM

CROSS-REFERENCE TO RELATED APPLICATION

This application claims priority to and benefits of Chinese Patent Application Serial No. 201310618439.6, filed with the State Intellectual Property Office of P. R. China on Nov. 28, 2013, the entire content of which is incorporated herein by reference.

FIELD

The present disclosure relates to a power system field, and more particularly to a method for charging an electric vehicle in a power system and a device for charging an electric vehicle in a power system.

BACKGROUND

Currently, the electric vehicle has been developed rapidly as the representative of the clean energy vehicle. However, there are some problems in the rapid development of the electric vehicle: the electric vehicle will influence the power system to a great extent when the number of the electric vehicles reaches a certain size and the electric vehicles are connected to the power system disorderly. For example, the power quality can be declined, the loss of the system power can be increased, and even the stability of the power system can be endangered. Therefore, it is necessary to optimize the charging behavior of the electric vehicle to avoid the above described effects, and to achieve that the charging power may be increased during the trough of the power system and may be decreased during the peak of the power system.

SUMMARY

Embodiments of the present disclosure seek to solve at least one of the problems existing in the related art to at least some extent.

According to a first aspect of the present disclosure, a method for charging an electric vehicle in a power system is provided. The method comprises the steps of: obtaining a first electric vehicle connected to the power system at a dispatching time, and obtaining a rated charging power and a first charging requirement at the dispatching time of each first electric vehicle respectively; determining a first charging period corresponding to the first electric vehicle; determining a forecast period, and obtaining a second electric vehicle to be connected to the power system in the forecast period, in which the forecast period is less than or equal to the first charging period; revising the first charging period to obtain a second charging period, and obtaining a second charging requirement and a maximum charging power of each second electric vehicle at each charging time in the second charging period respectively; establishing a charging model of the first electric vehicle and the second electric vehicle in the second charging period, establishing a first constraint of the charging model according to the rated charging power and the first charging requirement at the dispatching time of each first electric vehicle, and establishing a second constraint of the charging model according to the second charging requirement and the maximum charging power at each charging time in the second charging period of each second electric vehicle; and solving the charging model under the first constraint and the second constraint to obtain an optimal charging power of each electric vehicle at each charging time in the second charging period, and sending the optimal charging power at the dispatching time to each first electric vehicle so as to charge each first electric vehicle under the optimal charging power.

With the method for charging the electric vehicle in the power system according to embodiments of the present disclosure, the predicted data about the charging behavior corresponding to each electric vehicle (i.e., the second charging requirement and the maximum charging power at each charging time in the second charging period of each second electric vehicle) is used, the operating state of the power system and electric vehicles at each charging time in the forecast period is considered and the predicted data about the charging behavior corresponding to the electric vehicle being connected to the power system in the forecast period is used so as to establish the charging model. The charging model is taken into the real-time receding-horizon optimization model of the power system to obtain the optimal charging power of each electric vehicle, and the optimal charging power is sent to each first electric vehicle so that each first electric vehicle can be charged under the optimal charging power. Therefore, the effectiveness of the real-time charging can be improved, the charging power may be increased during the trough of the power system and may be decreased during the peak of the power system and the efficiency of power system may be increased and a good robustness is guaranteed.

According to a second aspect of the present disclosure, a device for charging an electric vehicle in a power system is provided. The device comprises: a first obtaining module, configured for obtaining a first electric vehicle connected to the power system at a dispatching time, and obtaining a rated charging power and a first charging requirement at the dispatching time of each first electric vehicle respectively; a first determining module, configured for determining a first charging period corresponding to the first electric vehicle; a second determining module, configured for determining a forecast period, in which the forecast period is less than or equal to the first charging period; a second obtaining module, configured for obtaining a second electric vehicle to be connected to the power system in the forecast period; a revising module, configured for revising the first charging period to obtain a second charging period; a third obtaining module, configured for obtaining a second charging requirement and a maximum charging power of each second electric vehicle at each charging time in the second charging period respectively; an establishing module, configured for establishing a charging model of the first electric vehicle and the second electric vehicle in the second charging period, establishing a first constraint of the charging model according to the rated charging power and the first charging requirement at the dispatching time of each first electric vehicle, and establishing a second constraint of the charging model according to the second charging requirement and the maximum charging power at each charging time in the second charging period of each second electric vehicle; a solving module, configured for solving the charging model under the first constraint and the second constraint to obtain an optimal charging power of each electric vehicle at each charging time in the second charging period; and a sending module, configured for sending the optimal charging power at the dispatching time to each first electric vehicle so as to charge each first electric vehicle under the optimal charging power.

With the device for charging the electric vehicle in the power system according to embodiments of the present disclosure, the predicted data about the charging behavior corresponding to each electric vehicle (i.e., the second charging requirement and the maximum charging power at each charging time in the second charging period of each second electric vehicle) is used, the operating state of the power system and electric vehicles at each charging time in the forecast period is considered and the predicted data about the charging behavior corresponding to the electric vehicle being connected to the power system in the forecast period is used so as to establish the charging model. The charging model is taken into the real-time scrolling optimization model of the power system to obtain the optimal charging power of each electric vehicle, and the optimal charging power is sent to each first electric vehicle so that each first electric vehicle can be charged under the optimal charging power. Therefore, the effectiveness of the real-time charging can be improved, the charging power may be increased during the trough of the power system and may be decreased during the peak of the power system and the efficiency of power system may be increased and a good robustness is guaranteed.

According to a third aspect of the present disclosure, a computer readable storage medium is provided. The computer readable storage medium comprises a computer program for executing the steps of: obtaining a first electric vehicle connected to the power system at a dispatching time, and obtaining a rated charging power and a first charging requirement at the dispatching time of each first electric vehicle respectively; determining a first charging period corresponding to the first electric vehicle; determining a forecast period, and obtaining a second electric vehicle to be connected to the power system in the forecast period, in which the forecast period is less than or equal to the first charging period; revising the first charging period to obtain a second charging period, and obtaining a second charging requirement and a maximum charging power of each second electric vehicle at each charging time in the second charging period respectively; establishing a charging model of the first electric vehicle and the second electric vehicle in the second charging period, establishing a first constraint of the charging model according to the rated charging power and the first charging requirement at the dispatching time of each first electric vehicle, and establishing a second constraint of the charging model according to the second charging requirement and the maximum charging power at each charging time in the second charging period of each second electric vehicle; and solving the charging model under the first constraint and the second constraint to obtain an optimal charging power of each electric vehicle at each charging time in the second charging period, and sending the optimal charging power to each first electric vehicle so as to charge each first electric vehicle under the optimal charging power.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of embodiments of the present disclosure will become apparent and more readily appreciated from the following descriptions made with reference to the drawings, in which.

DETAILED DESCRIPTION

Figure 1:
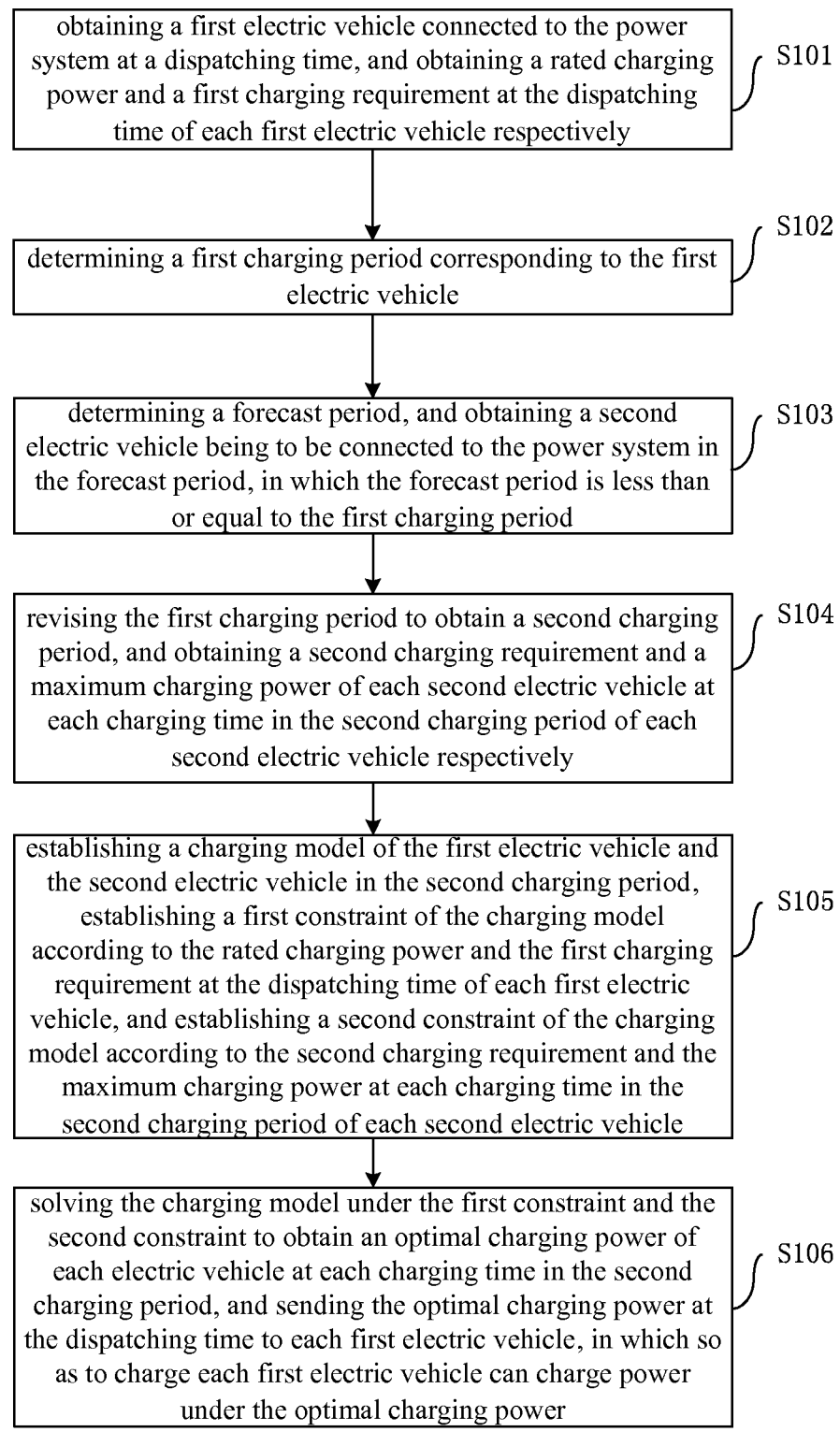
FIG. 1 is a flow chart of a method for charging an electric vehicle in a power system according to an embodiment of the present disclosure.

Reference will be made in detail to embodiments of the present disclosure. The embodiments described herein with reference to drawings are explanatory, illustrative, and used to generally understand the present disclosure. The embodiments shall not be construed to limit the present disclosure. The same or similar elements and the elements having same or similar functions are denoted by like reference numerals throughout the descriptions.

In addition, terms such as "first" and "second" are used herein for purposes of description and are not intended to indicate or imply relative importance or significance. Thus, the feature defined with "first" and "second" may comprise one or more this feature. In the description of the present disclosure, the term "a plurality of" means two or more than two, unless specified otherwise.

In the description of the present disclosure, it should be understood that, unless specified or limited otherwise, the terms "mounted," "connected," and "coupled" and variations thereof are used broadly and encompass such as mechanical or electrical mountings, connections and couplings, also can be inner mountings, connections and couplings of two components, and further can be direct and indirect mountings, connections, and couplings, which can be understood by those skilled in the art according to the detail embodiment of the present disclosure.

In the following, a method for charging an electric vehicle in a power system according to embodiments of the present disclosure will be described in detail with reference to the drawings.

FIG. 1 is a flow chart of a method for charging an electric vehicle in a power system according to an embodiment of the present disclosure.

As shown in FIG. 1, the method includes the following steps.

At step 101, a first electric vehicle connected to the power system at a dispatching time is obtained, and a rated charging power and a first charging requirement at the dispatching time of each first electric vehicle are obtained respectively.

In some embodiments, a connected time of each first electric vehicle is less than or equal to the dispatching time, the departure time of each first electric vehicle is greater than the dispatching time, and the first charging requirement at the dispatching time of each first electric vehicle is greater than 0. Specifically, firstly, at the dispatching time, the electric vehicles connected to the power system are obtained from the power system control center, meanwhile the connected time, the departure time, the rated charging power and the first charging requirement at the dispatching time of each electric vehicle are obtained, in which, the first charging requirement is net charging requirement at the dispatching time; then, each first electric vehicle is selected according to the connected time, the departure time and the first charging requirement at the dispatching time, which is expressed according to formula (1), $$M_t = \{n \in N | t_n^{in} \leq t < t_n^{out}, R_n^t > 0\} \quad (1)$$

where $M_t$ represents a set of the first electric vehicle, t represents the dispatching time, N represents the number of the first electric vehicle, n represents the $n^{th}$ first electric vehicle, $t_n^{in}$ represents the connected time of the $n^{th}$ first electric vehicle, $t_n^{out}$ represents the departure time of the $n^{th}$ first electric vehicle, $R_n^t$ represents the first charging requirement of the $n^{th}$ first electric vehicle.

At step 102, a first charging period corresponding to the first electric vehicle is determined.

In some embodiments, step 102 includes the following steps: a first latest departure time from departure times when each first electric vehicle leaves the power system is obtained, and a period which is from the dispatching time to the first latest departure time is taken as the first charging period, in which each charging time in the first charging period is greater than or equal to the dispatching time and is less than or equal to the first latest departure time, which is expressed according to formula (2), $$\Omega_t = \left\{ k \mid t \le k \le \max_{n \in M_t} t_n^{out} \right\} \quad (2)$$

where $\Omega_t$ represents the first charging period, k represents the $k^{th}$ charging time in the first charging period, n represents the $n^{th}$ first electric vehicle, $M_t$ represents the set of the first electric vehicle, $t_n^{out}$ represents the departure time of the $n^{th}$ first electric vehicle.

At step 103, a forecast period is determined, and a second electric vehicle to be connected to the power system in the forecast period is obtained, in which the forecast period is less than or equal to the first charging period.

In some embodiments, a connected time of each second electric vehicle is greater than the dispatching time, and is less than or equal to a time when the dispatching time is extended to the forecast period. Specifically, firstly, the electric vehicles to be connected to the power system at the forecast period are obtained from the power system control center, meanwhile the connected time, the departure time, the second charging requirement are obtained; then, each second electric vehicle is selected according to the connected time, which is expressed according to formula (3), $$L_t = \{ n \in N \mid t < \hat{t}_n^{in} \le t + T^p \} \quad (3)$$

where $L_t$ represents a set of the second electric vehicle, t represents the dispatching time, N represents the number of the second electric vehicle, n represents the $n^{th}$ second electric vehicle, $\hat{t}_n^{in}$ represents the connected time of the $n^{th}$ second electric vehicle, $T^p$ represents the forecast period.

At step 104, the first charging period is revised to obtain a second charging period, and a second charging requirement and a maximum charging power at each charging time in the second charging period of each second electric vehicle are obtained respectively.

In some embodiments, step 104 includes the following steps: a second latest departure time is selected from departure times when each first electric vehicle and each second electric vehicle leave the power system, and the first charging period is extended to the second latest departure time to obtain the second charging period, in which each charging time in the second charging period is greater than or equal to the dispatching time and is less than or equal to the second latest departure time.

At step 105, a charging model of the first electric vehicle and the second electric vehicle in the second charging period is established, a first constraint of the charging model according to the rated charging power and the first charging requirement at the dispatching time of each first electric vehicle is established, and a second constraint of the charging model according to the second charging requirement and the maximum charging power at each charging time in the second charging period of each second electric vehicle is established.

In some embodiments, the charging model is expressed according to formula (4), $$\min_{r_n(k), n \in M_t \cup L_t} \sum_{k \in \Omega_t} \left( \sum_{n \in M_t} r_n(k) + \sum_{n \in L_t} r_n(k) + D^0(k) \right)^2 \quad (4)$$

$$\text{s.t. } (I) \begin{cases} 0 \le r_n(k) \le r_n^{max}, k \in \Omega_t, \ n \in M_t \\ \sum_{k \in \Omega_t} r_n(k) \Delta t = R_n^t, \quad n \in M_t \end{cases}$$

$$(II) \begin{cases} 0 \le r_n(k) \le \hat{r}_n(k), k \in \Omega_t, \ n \in L_t \\ \sum_{k \in \Omega_t / \{t\}} r_n(k) \Delta t = \hat{R}_n, \quad n \in L_t \end{cases}$$

where t represents the dispatching time, n represents the $n^{th}$ electric vehicle (includes the first electric vehicle and the second electric vehicle), k represents the $k^{th}$ charging time in the second charging period, $r_n(k)$ represents the optimal charging power of the $n^{th}$ electric vehicle at the $k^{th}$ charging time, $M_t$ represents a set of the first electric vehicle, $L_t$ represents a set of the second electric vehicle, $\Omega_t$ represents the second charging period, $D^0(k)$ represents a conventional load power at the $k^{th}$ charging time of the power system, $r_n^{max}$ represents the rated charging power of the $n^{th}$ electric vehicle, $R_n^t$ represents the first charging requirement of the $n^{th}$ electric vehicle at the $k^{th}$ charging time, $\Delta t$ represents an interval between two charges, $\hat{r}_n(k)$ represents the maximum charging power of the $n^{th}$ electric vehicle at the $k^{th}$ charging time, $\hat{R}_n$ represents the second charging requirement of the $n^{th}$ electric vehicle.

It should be understood that the second charging period is extended from the first charging period, so the maximum charging power and the rated charging power at the extended charging time will be 0.

At step 106, the charging model under the first constraint and the second constraint is solved to obtain an optimal charging power of each electric vehicle at each charging time in the second charging period, and the optimal charging power at the dispatching time is sent to each first electric vehicle so as to charge each first electric vehicle under the optimal charging power.

With the method for charging the electric vehicle in the power system according to embodiments of the present disclosure, the predicted data about the charging behavior corresponding to each electric vehicle (i.e., the second charging requirement and the maximum charging power at each charging time in the second charging period of each second electric vehicle) is used, the operating state of the power system and electric vehicles at each charging time in the forecast period is considered and the predicted data about the charging behavior corresponding to the electric vehicle being connected to the power system in the forecast period is used so as to establish the charging model. The charging model is taken into the real-time scrolling optimization model of the power system to obtain the optimal charging power of each electric vehicle, and the optimal charging power is sent to each first electric vehicle so that each first electric vehicle can be charged under the optimal charging power. Therefore, the effectiveness of the real-time charging can be improved, the charging power may be increased during the trough of the power system and may be decreased during the peak of the power system and the efficiency of power system may be increased and a good robustness is guaranteed. For example, in the case that the predicted charging time error of a single electric vehicle is 30 minutes, the present method still has a significant improvement.

In the following, a device for charging an electric vehicle in a power system according to embodiments of the present disclosure will be described in detail with reference to the drawings.

Figure 2:
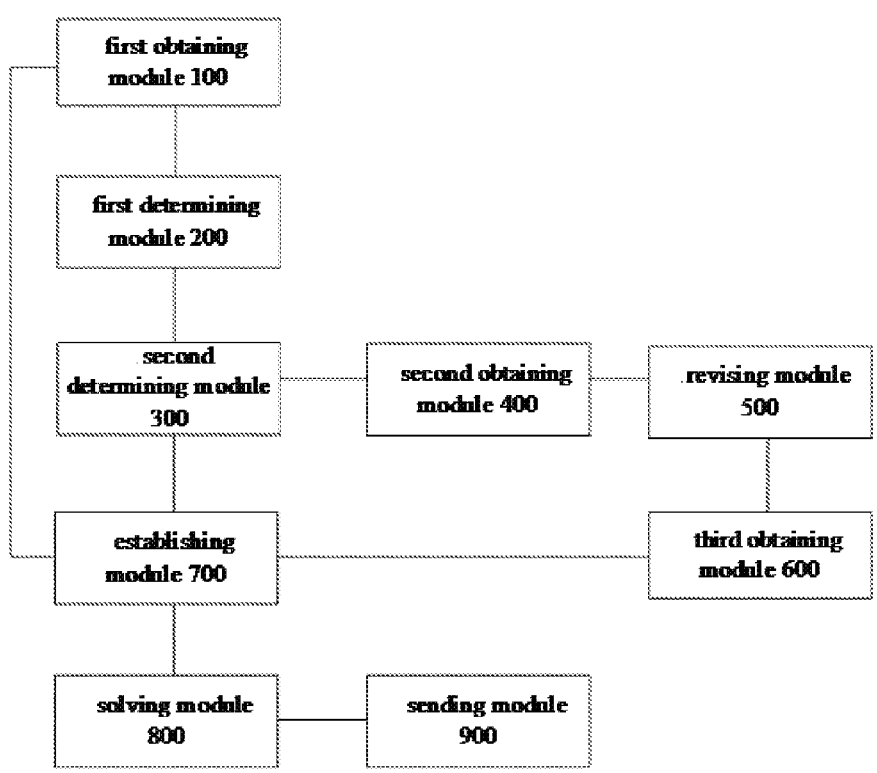
FIG. 2 is a block diagram of a device for charging an electric vehicle in a power system according to an embodiment of the present disclosure.

FIG. 2 is a block diagram of a device for charging an electric vehicle in a power system according to an embodiment of the present disclosure.

As shown in FIG. 2, the device comprises a first obtaining module 100, a first determining module 200, a second determining module 300, a second obtaining module 400, a revising module 500, a third obtaining module 600, a establishing module 700, a solving module 800 and a sending module 900.

Specifically, the first obtaining module 100 is configured for obtaining a first electric vehicle connected to the power system at a dispatching time, and obtaining a rated charging power and a first charging requirement at the dispatching time of each first electric vehicle respectively.

In some embodiments, a connected time of each first electric vehicle is less than or equal to the dispatching time, the departure time of each first electric vehicle is greater than the dispatching time, and the first charging requirement at the dispatching time of each first electric vehicle is greater than 0. Specifically, firstly, at the dispatching time, the first obtaining module 100 obtains the electric vehicles connected to the power system from the power system control center, meanwhile obtains the connected time, the departure time, the rated charging power and the first charging requirement at the dispatching time of each electric vehicle, in which, the first charging requirement is net charging requirement at the dispatching time; then, the first obtaining module 100 selects each first electric vehicle according to the connected time, the departure time and the first charging requirement at the dispatching time, which is expressed according to formula (1), $$M_t = \{n \in N | t_n^{in} \le t < t_n^{out}, R_n^t > 0\} \quad (1)$$

where $M_t$ represents a set of the first electric vehicle, t represents the dispatching time, N represents the number of the first electric vehicle, n represents the $n^{th}$ first electric vehicle, $t_n^{in}$ represents the connected time of the $n^{th}$ first electric vehicle, $t_n^{out}$ represents the departure time of the $n^{th}$ first electric vehicle, $R_n^t$ represents the first charging requirement of the $n^{th}$ first electric vehicle.

The first determining module 200 is configured for determining a first charging period corresponding to the first electric vehicle.

In some embodiments, the first determining module 200 is further configured for: selecting a first latest departure time from departure times when each first electric vehicle leaves the power system, and taking a period which is from the dispatching time to the first latest departure time as the first charging period, in which each charging time in the first charging period is greater than or equal to the dispatching time and is less than or equal to the first latest departure time, which is expressed according to formula (2), $$\Omega_t = \left\{ k \mid t \le k \le \max_{n \in M_t} t_n^{out} \right\} \quad (2)$$

where $\Omega_t$ represents the first charging period, k represents the $k^{th}$ charging time in the first charging period, n represents the $n^{th}$ first electric vehicle, $M_t$ represents the set of the first electric vehicle, $t_n^{out}$ represents the departure time of the $n^{th}$ first electric vehicle.

The second determining module 300 is configured for determining a forecast period, in which the forecast period is less than or equal to the first charging period.

The second obtaining module 400 is configured for obtaining a second electric vehicle to be connected to the power system in the forecast period.

In some embodiments, a connected time of each second electric vehicle is greater than the dispatching time, and is less than or equal to a time when the dispatching time is extended to the forecast period. Specifically, firstly, the second obtaining module 400 obtains the electric vehicles to be connected to the power system at the forecast period from the power system control center, meanwhile obtains the connected time, the departure time, the second charging requirement; then, the second obtaining module 400 selects each second electric vehicle according to the connected time, which is expressed according to formula (3), $$L_t = \{n \in N | t < \hat{t}_n^{in} \le t + T^p\} \quad (3)$$

where $L_t$ represents a set of the second electric vehicle, t represents the dispatching time, N represents the number of the second electric vehicle, n represents the $n^{th}$ second electric vehicle, $\hat{t}_n^{in}$ represents the connected time of the $n^{th}$ second electric vehicle, $T^p$ represents the forecast period.

The revising module 500 is configured for revising the first charging period to obtain a second charging period.

In some embodiments, the revising module 500 is further configured for: selecting a second latest departure time from departure times when each first electric vehicle and each second electric vehicle leave the power system, and extending the first charging period to the second latest departure time to obtain the second charging period, in which each charging time in the second charging period is greater than or equal to the dispatching time and is less than or equal to the second latest departure time.

The third obtaining module 600 is configured for obtaining a second charging requirement and a maximum charging power at each charging time in the second charging period of each second electric vehicle respectively.

The establishing module 700 is configured for establishing a charging model of the first electric vehicle and the second electric vehicle in the second charging period, establishing a first constraint of the charging model according to the rated charging power and the first charging requirement at the dispatching time of each first electric vehicle, and establishing a second constraint of the charging model according to the second charging requirement and the maximum charging power at each charging time in the second charging period of each second electric vehicle.

In some embodiments, the charging model is expressed according to formula (4), $$\min_{r_n(k), n \in M_t \cup L_t} \sum_{k \in \Omega_t} \left( \sum_{n \in M_t} r_n(k) + \sum_{n \in L_t} r_n(k) + D^0(k) \right)^2 \quad (4)$$

$$\text{s.t. } (I) \begin{cases} 0 \le r_n(k) \le r_n^{max}, & k \in \Omega_t, n \in M_t \\ \sum_{k \in \Omega_t} r_n(k) \Delta t = R_n^t, & n \in M_t \end{cases}$$

-continued $$(II) \begin{cases} 0 \le r_n(k) \le \bar{r}_n(k), k \in \Omega_t, \quad n \in L_t \\ \sum_{k \in \Omega_t/\{t\}} r_n(k)\Delta t = \hat{R}_n, \quad n \in L_t \end{cases}$$

where t represents the dispatching time, n represents the $n^{th}$ electric vehicle (includes the first electric vehicle and the second electric vehicle), k represents the $k^{th}$ charging time in the second charging period, $r_n(k)$ represents the optimal charging power of the $n^{th}$ electric vehicle at the $k^{th}$ charging time, $M_t$ represents a set of the first electric vehicle, $L_t$ represents a set of the second electric vehicle, $\Omega_t$ represents the second charging period, $D^0(k)$ represents a conventional load power at the $k^{th}$ charging time of the power system, $r_n^{max}$ represents the rated charging power of the $n^{th}$ electric vehicle, $R_n^t$ represents the first charging requirement of the $n^{th}$ electric vehicle at the $k^{th}$ charging time, $\Delta t$ represents an interval between two charges, $\bar{r}_n(k)$ represents the maximum charging power of the $n^{th}$ electric vehicle at the $k^{th}$ charging time, $\hat{R}_n$ represents the second charging requirement of the $n^{th}$ electric vehicle.

It should be understood that the second charging period is extended from the first charging period, so the maximum charging power and the rated charging power at the extended charging time will be 0.

The solving module 800 is configured for solving the charging model under the first constraint and the second constraint to obtain an optimal charging power of each electric vehicle at each charging time in the second charging period.

The sending module 900 is configured for sending the optimal charging power at the dispatching time to each first electric vehicle so as to charge each first electric vehicle under the optimal charging power.

With the device for charging the electric vehicle in the power system according to embodiments of the present disclosure, the predicted data about the charging behavior corresponding to each electric vehicle (i.e., the second charging requirement and the maximum charging power at each charging time in the second charging period of each second electric vehicle) is used, the operating state of the power system and electric vehicles at each charging time in the forecast period is considered and the predicted data about the charging behavior corresponding to the electric vehicle being connected to the power system in the forecast period is used so as to establish the charging model. The charging model is taken into the real-time scrolling optimization model of the power system to obtain the optimal charging power of each electric vehicle, and the optimal charging power is sent to each first electric vehicle so that each first electric vehicle can be charged under the optimal charging power. Therefore, the effectiveness of the real-time charging can be improved, the charging power may be increased during the trough of the power system and may be decreased during the peak of the power system and the efficiency of power system may be increased and a good robustness is guaranteed. For example, in the case that the predicted charging time error of a single electric vehicle is 30 minutes, the present method still has a significant improvement.

In the following, computer readable storage medium according to embodiments of the present disclosure will be described in detail.

In some embodiments, the computer readable storage medium, comprising a computer program for executing steps of: a first electric vehicle connected to the power system at a dispatching time is obtained, and a rated charging power and a first charging requirement at the dispatching time of each first electric vehicle are obtained respectively; a first charging period corresponding to the first electric vehicle is determined; a forecast period is determined, and a second electric vehicle to be connected to the power system in the forecast period is obtained, in which the forecast period is less than or equal to the first charging period; the first charging period is revised to obtain a second charging period, and a second charging requirement and a maximum charging power at each charging time in the second charging period of each second electric vehicle are obtained respectively; a charging model of the first electric vehicle and the second electric vehicle in the second charging period is established, a first constraint of the charging model according to the rated charging power and the first charging requirement at the dispatching time of each first electric vehicle is established, and a second constraint of the charging model according to the second charging requirement and the maximum charging power at each charging time in the second charging period of each second electric vehicle is established; and the charging model under the first constraint and the second constraint is solved to obtain an optimal charging power of each electric vehicle at each charging time in the second charging period, and the optimal charging power at the dispatching time is sent to each first electric vehicle so as to charge each first electric vehicle under the optimal charging power.

Any process or method described in the flowing diagram or other means may be understood as a module, segment or portion including one or more executable instruction codes of the procedures configured to achieve a certain logic function or process, and the preferred embodiments of the present disclosure include other performances, in which the performance may be achieved in other orders instead of the order shown or discussed, such as in a almost simultaneous way or in an opposite order, which should be appreciated by those having ordinary skills in the art to which embodiments of the present disclosure belong.

The logic and/or procedures indicated in the flowing diagram or described in other means herein, such as a constant sequence table of the executable code for performing a logical function, may be implemented in any computer readable storage medium so as to be adopted by the code execution system, the device or the equipment (such a system based on the computer, a system including a processor or other systems fetching codes from the code execution system, the device and the equipment, and executing the codes) or to be combined with the code execution system, the device or the equipment to be used. With respect to the description of the present invention, "the computer readable storage medium" may include any device including, storing, communicating, propagating or transmitting program so as to be used by the code execution system, the device and the equipment or to be combined with the code execution system, the device or the equipment to be used. The computer readable medium includes specific examples (a non-exhaustive list): the connecting portion (electronic device) having one or more arrangements of wire, the portable computer disc cartridge (a magnetic device), the random access memory (RAM), the read only memory (ROM), the electrically programmable read only memory (EPROMM or the flash memory), the optical fiber device and the compact disk read only memory (CDROM). In addition, the computer readable storage medium even may be papers or other proper medium printed with program, as the papers or the proper medium may be optically scanned, then edited, interpreted or treated in other ways if necessary to obtain the program electronically which may be stored in the computer memory.

It should be understood that, each part of the present invention may be implemented by the hardware, software, firmware or the combination thereof. In the above embodiments of the present invention, the plurality of procedures or methods may be implemented by the software or hardware stored in the computer memory and executed by the proper code execution system. For example, if the plurality of procedures or methods is to be implemented by the hardware, like in another embodiment of the present invention, any one of the following known technologies or the combination thereof may be used, such as discrete logic circuits having logic gates for implementing various logic functions upon an application of one or more data signals, application specific integrated circuits having appropriate logic gates, programmable gate arrays (PGA), field programmable gate arrays (FPGA).

It can be understood by those having the ordinary skills in the related art that all or part of the steps in the method of the above embodiments can be implemented by instructing related hardware via programs, the program may be stored in a computer readable storage medium, and the program includes one step or combinations of the steps of the method when the program is executed.

In addition, each functional unit in the present disclosure may be integrated in one progressing module, or each functional unit exists as an independent unit, or two or more functional units may be integrated in one module. The integrated module can be embodied in hardware, or software. If the integrated module is embodied in software and sold or used as an independent product, it can be stored in the computer readable storage medium.

The computer readable storage medium may be, but is not limited to, read-only memories, magnetic disks, or optical disks.

One or more elements of the device for charging the electric vehicle in the power system and any acts of the methods disclosed herein may be implemented, for example, on any form of computer or computers and the components may be implemented as dedicated applications or in client-server architectures, including a web-based architecture, and can include functional programs, codes, and code segments. Any of the computers may comprise a processor, a memory for storing program data and executing, a permanent storage such as a disk drive, a communications port for handling communications with external devices, and user interface devices, including a display, keyboard, mouse, etc. When software modules are involved, these software modules may be stored as program instructions or computer readable codes executable on the processor on a non-transitory computer-readable media such as read-only memory (ROM), random-access memory (RAM), CD-ROMs, magnetic tapes, floppy disks, and optical data storage devices. The computer readable recording medium can also be distributed over network coupled computer systems so that the computer readable code is stored and executed in a distributed fashion. This media is readable by the computer, stored in the memory, and executed by the processor. For example one or more parts of the system may be implemented by a computer processor with associated memory and timing circuitry (not separately shown) that is a functional part of the system and is activated by, and facilitates functionality of other components or parts of the system.

Reference throughout this specification to "an embodiment," "some embodiments," "one embodiment", "another example," "an example," "a specific example," or "some examples," means that a particular feature, structure, material, or characteristic described in connection with the embodiment or example is included in at least one embodiment or example of the present disclosure. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present disclosure. Furthermore, the particular features, structures, materials, or characteristics may be combined in any suitable manner in one or more embodiments or examples.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A method for charging an electric vehicle in a power system, comprising:

obtaining a first electric vehicle connected to the power system at a dispatching time, and obtaining a rated charging power and a first charging requirement at the dispatching time of each first electric vehicle respectively;

determining a first charging period corresponding to the first electric vehicle;

determining a forecast period, and obtaining a second electric vehicle to be connected to the power system in the forecast period, in which the forecast period is less than or equal to the first charging period;

revising the first charging period to obtain a second charging period, and obtaining a second charging requirement and a maximum charging power of each second electric vehicle at each charging time in the second charging period respectively;

establishing a charging model of the first electric vehicle and the second electric vehicle in the second charging period, establishing a first constraint of the charging model according to the rated charging power and the first charging requirement at the dispatching time of each first electric vehicle, and establishing a second constraint of the charging model according to the second charging requirement and the maximum charging power at each charging time in the second charging period of each second electric vehicle; and solving the charging model under the first constraint and the second constraint to obtain an optimal charging power of each electric vehicle at each charging time in the second charging period, and sending the optimal charging power at the dispatching time to each first electric vehicle so as to charge each first electric vehicle under the optimal charging power, wherein, the charging model is expressed according to formula (1), $$\min_{r_n(k), n \in M_t \cup L_t} \sum_{k \in \Omega_t} \left( \sum_{n \in M_t} r_n(k) + \sum_{n \in L_t} r_n(k) + D^0(k) \right)^2 \quad (1)$$

-continued $$s.t.\ (I)\begin{cases} 0 \le r_n(k) \le r_n^{max}, k \in \Omega_t,\ n \in M_t \\ \sum_{k \in \Omega_t} r_n(k)\Delta t = R_n^t, \quad n \in M_t \end{cases}$$

$$(II)\begin{cases} 0 \le r_n(k) \le \hat{r}_n(k), k \in \Omega_t,\ n \in L_t \\ \sum_{k \in \Omega_t/\{t\}} r_n(k)\Delta t = \hat{R}_n, \quad n \in L_t \end{cases}$$

where t represents the dispatching time, n represents the $n^{th}$ electric vehicle, k represents the $k^{th}$ charging time in the second charging period, $r_n(k)$ represents the optimal charging power of the $n^{th}$ electric vehicle at the $k^{th}$ charging time, $M_t$ represents a set of the first electric vehicle, $L_t$ represents a set of the second electric vehicle, $\Omega_t$ represents the second charging period, $D^0(k)$ represents a conventional load power at the $k^{th}$ charging time of the power system, $r_n^{max}$ represents the rated charging power of the $n^{th}$ electric vehicle, $R_n^t$ represents the first charging requirement of the $n^{th}$ electric vehicle at the $k^{th}$ charging time, $\Delta t$ represents an interval between two charges, $\hat{r}_n(k)$ represents the maximum charging power of the $n^{th}$ electric vehicle at the $k^{th}$ charging time, $\hat{R}_n$ represents the second charging requirement of the $n^{th}$ electric vehicle.

2. The method according to claim 1, wherein determining a first charging period corresponding to the first electric vehicle comprises:
selecting a first latest departure time from departure times when each first electric vehicle leaves the power system, and taking a period which is from the dispatching time to the first latest departure time as the first charging period, in which each charging time in the first charging period is greater than or equal to the dispatching time and is less than or equal to the first latest departure time.

3. The method according to claim 2, wherein revising the first charging period to obtain a second charging period comprises:
selecting a second latest departure time from departure times when each first electric vehicle and each second electric vehicle leave the power system, and extending the first charging period to the second latest departure time to obtain the second charging period, in which each charging time in the second charging period is greater than or equal to the dispatching time and is less than or equal to the second latest departure time.

4. The method according to claim 1, wherein a connected time of each first electric vehicle is less than or equal to the dispatching time, the departure time of each first electric vehicle is greater than the dispatching time, and the first charging requirement at the dispatching time of each first electric vehicle is greater than 0.

5. The method according to claim 1, wherein a connected time of each second electric vehicle is greater than the dispatching time, and is less than or equal to a time when the dispatching time is extended to the forecast period.

6. A device for charging an electric vehicle in a power system, comprising:
a non-transitory memory comprising instructions stored thereon:
a processor, configured by the instructions for performing and comprising:
a first obtaining module, configured for obtaining a first electric vehicle connected to the power system at a dispatching time, and obtaining a rated charging power and a first charging requirement at the dispatching time of each first electric vehicle respectively;
a first determining module, configured for determining a first charging period corresponding to the first electric vehicle;
a second determining module, configured for determining a forecast period, in which the forecast period is less than or equal to the first charging period;
a second obtaining module, configured for obtaining a second electric vehicle to be connected to the power system in the forecast period;
a revising module, configured for revising the first charging period to obtain a second charging period;
a third obtaining module, configured for obtaining a second charging requirement and a maximum charging power of each second electric vehicle at each charging time in the second charging period respectively;
an establishing module, configured for establishing a charging model of the first electric vehicle and the second electric vehicle in the second charging period, establishing a first constraint of the charging model according to the rated charging power and the first charging requirement at the dispatching time of each first electric vehicle, and establishing a second constraint of the charging model according to the second charging requirement and the maximum charging power at each charging time in the second charging period of each second electric vehicle;
a solving module, configured for solving the charging model under the first constraint and the second constraint to obtain an optimal charging power of each electric vehicle at each charging time in the second charging period; and
a sending module, configured for sending the optimal charging power at the dispatching time to each first electric vehicle so as to charge each first electric vehicle under the optimal charging power,
wherein the charging model is expressed according to formula (1), $$\min_{r_n(k), n \in M_t \cup L_t} \sum_{k \in \Omega_t} \left( \sum_{n \in M_t} r_n(k) + \sum_{n \in L_t} r_n(k) + D^0(k) \right)^2 \quad (1)$$

$$s.t.\ (I)\begin{cases} 0 \le r_n(k) \le r_n^{max}, k \in \Omega_t,\ n \in M_t \\ \sum_{k \in \Omega_t} r_n(k)\Delta t = R_n^t, \quad n \in M_t \end{cases}$$

$$(II)\begin{cases} 0 \le r_n(k) \le \hat{r}_n(k), k \in \Omega_t,\ n \in L_t \\ \sum_{k \in \Omega_t/\{t\}} r_n(k)\Delta t = \hat{R}_n, \quad n \in L_t \end{cases}$$

where t represents the dispatching time, n represents the $n^{th}$ electric vehicle, k represents the $k^{th}$ charging time in the second charging period, $r_n(k)$ represents the optimal charging power of the $n^{th}$ electric vehicle at the $k^{th}$ charging time, $M_t$ represents a set of the first electric vehicle, $L_t$ represents a set of the second electric vehicle, $\Omega_t$ represents the second charging period, $D^0(k)$ represents a conventional load power at the $k^{th}$ charging time of the power system, $r_n^{max}$ represents the rated charging power of the $n^{th}$ electric vehicle, $R_n^t$ represents the first charging requirement of the $n^{th}$ electric vehicle at the $k^{th}$ charging time, $\Delta t$ represents an interval between two charges, $\bar{r}_n(k)$ represents the maximum charging power of the $n^{th}$ electric vehicle at the $k^{th}$ charging time, $\hat{R}_n$ represents the second charging requirement of the $n^{th}$ electric vehicle.

7. The device according to claim 6, wherein the first determining module is further configured for:
   selecting a first latest departure time from departure times when each first electric vehicle leaves the power system, and taking a period which is from the dispatching time to the first latest departure time as the first charging period, in which each charging time in the first charging period is greater than or equal to the dispatching time and is less than or equal to the first latest departure time.

8. The device according to claim 7, wherein the revising module is further configured for:
   selecting a second latest departure time from departure times when each first electric vehicle and each second electric vehicle leave the power system, and extending the first charging period to the second latest departure time to obtain the second charging period, in which each charging time in the second charging period is greater than or equal to the dispatching time and is less than or equal to the second latest departure time.

9. The device according to claim 6, wherein a connected time of each first electric vehicle is less than or equal to the dispatching time, the departure time of each first electric vehicle is greater than the dispatching time, and the first charging requirement at the dispatching time of each first electric vehicle is greater than 0.

10. The device according to claim 7, wherein a connected time of each second electric vehicle is greater than the dispatching time, and is less than or equal to a time when the dispatching time is extended to the forecast period.

11. A non-transitory computer readable storage medium comprising a computer program for executing acts of:
    obtaining a first electric vehicle connected to the power system at a dispatching time, and obtaining a rated charging power and a first charging requirement at the dispatching time of each first electric vehicle respectively;
    determining a first charging period corresponding to the first electric vehicle;
    determining a forecast period, and obtaining a second electric vehicle to be connected to the power system in the forecast period, in which the forecast period is less than or equal to the first charging period;
    revising the first charging period to obtain a second charging period, and obtaining a second charging requirement and a maximum charging power of each second electric vehicle at each charging time in the second charging period respectively;
    establishing a charging model of the first electric vehicle and the second electric vehicle in the second charging period, establishing a first constraint of the charging model according to the rated charging power and the first charging requirement at the dispatching time of each first electric vehicle, and establishing a second constraint of the charging model according to the second charging requirement and the maximum charging power at each charging time in the second charging period of each second electric vehicle; and
    solving the charging model under the first constraint and the second constraint to obtain an optimal charging power of each electric vehicle at each charging time in the second charging period, and sending the optimal charging power to each first electric vehicle, in which each first electric vehicle can charge power under the optimal charging power,
    wherein, the charging model is expressed according to formula (1), $$\min_{r_n(k), n \in M_t \cup L_t} \sum_{k \in \Omega_t} \left( \sum_{n \in M_t} r_n(k) + \sum_{n \in L_t} r_n(k) + D^0(k) \right)^2 \quad (1)$$

$$\text{s.t.} \quad (I) \begin{cases} 0 \leq r_n(k) \leq r_n^{max}, k \in \Omega_t, \ n \in M_t \\ \sum_{k \in \Omega_t} r_n(k) \Delta t = R_n^t, \quad n \in M_t \end{cases}$$

$$(II) \begin{cases} 0 \leq r_n(k) \leq \hat{r}_n(k), k \in \Omega_t, \ n \in L_t \\ \sum_{k \in \Omega_t/\{t\}} r_n(k) \Delta t = \hat{R}_n, \quad n \in L_t \end{cases}$$

where t represents the dispatching time, n represents the $n^{th}$ electric vehicle, k represents the $k^{th}$ charging time in the second charging period, $r_n(k)$ represents the optimal charging power of the $n^{th}$ electric vehicle at the $k^{th}$ charging time, $M_t$ represents a set of the first electric vehicle, $L_t$ represents a set of the second electric vehicle, $\Omega_t$ represents the second charging period, $D^0(k)$ represents a conventional load power at the $k^{th}$ charging time of the power system, $r_n^{max}$ represents the rated charging power of the $n^{th}$ electric vehicle, $R_n^t$ represents the first charging requirement of the $n^{th}$ electric vehicle at the $k^{th}$ charging time, $\Delta t$ represents an interval between two charges, $\bar{r}_n(k)$ represents the maximum charging power of the $n^{th}$ electric vehicle at the $k^{th}$ charging time, $\hat{R}_n$ represents the second charging requirement of the $n^{th}$ electric vehicle.

* * * * *